March 21, 1950 J. R. LONGSTREET 2,501,281
GEAR TRAIN FOR MACHINE TOOL SLIDES
Filed March 11, 1946 2 Sheets-Sheet 1
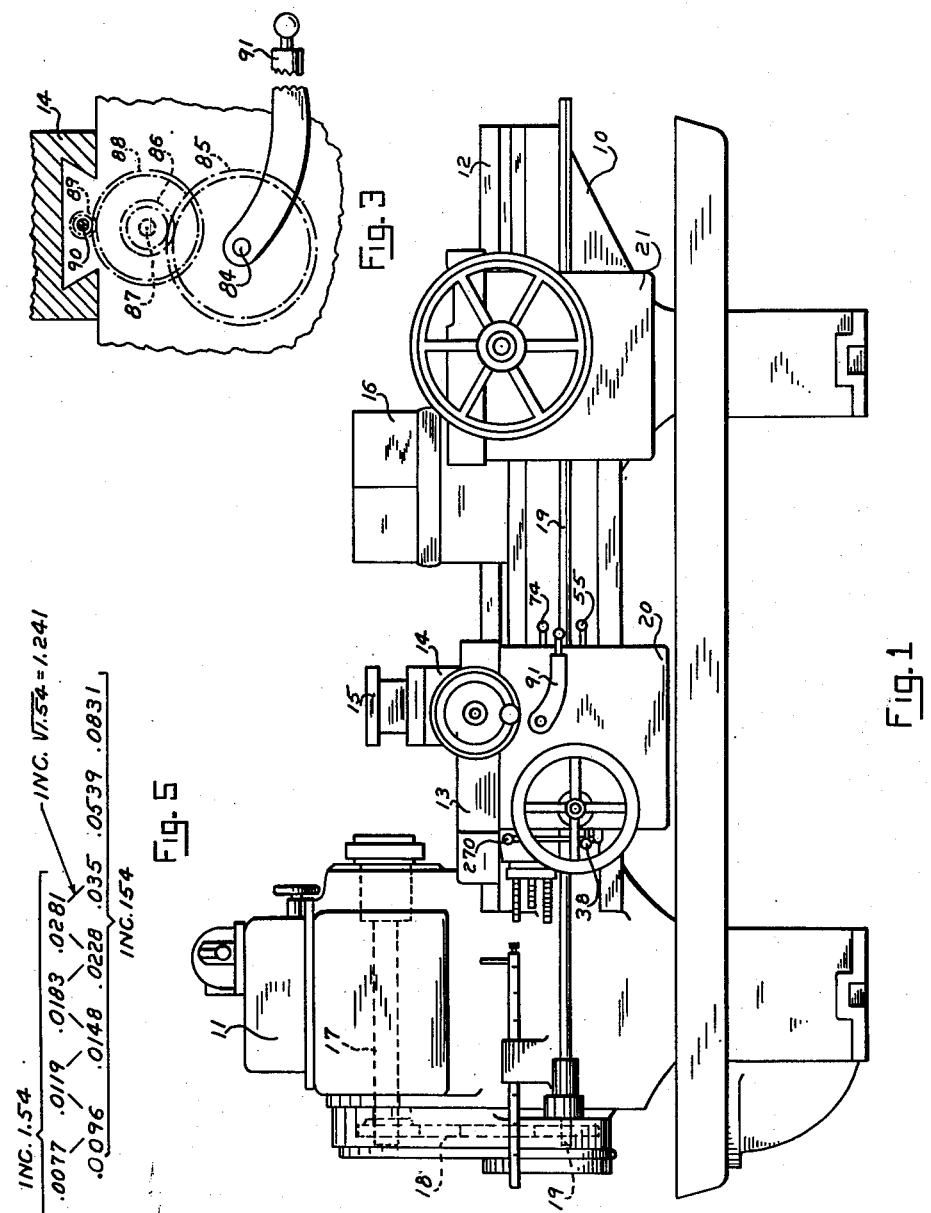
INVENTOR.
JAMES R. LONGSTREET
BY
Kwis, Hudson, Boughton & Williams
ATTORNEYS March 21, 1950 J. R. LONGSTREET 2,501,281
GEAR TRAIN FOR MACHINE TOOL SLIDES
Filed March 11, 1946 2 Sheets-Sheet 2
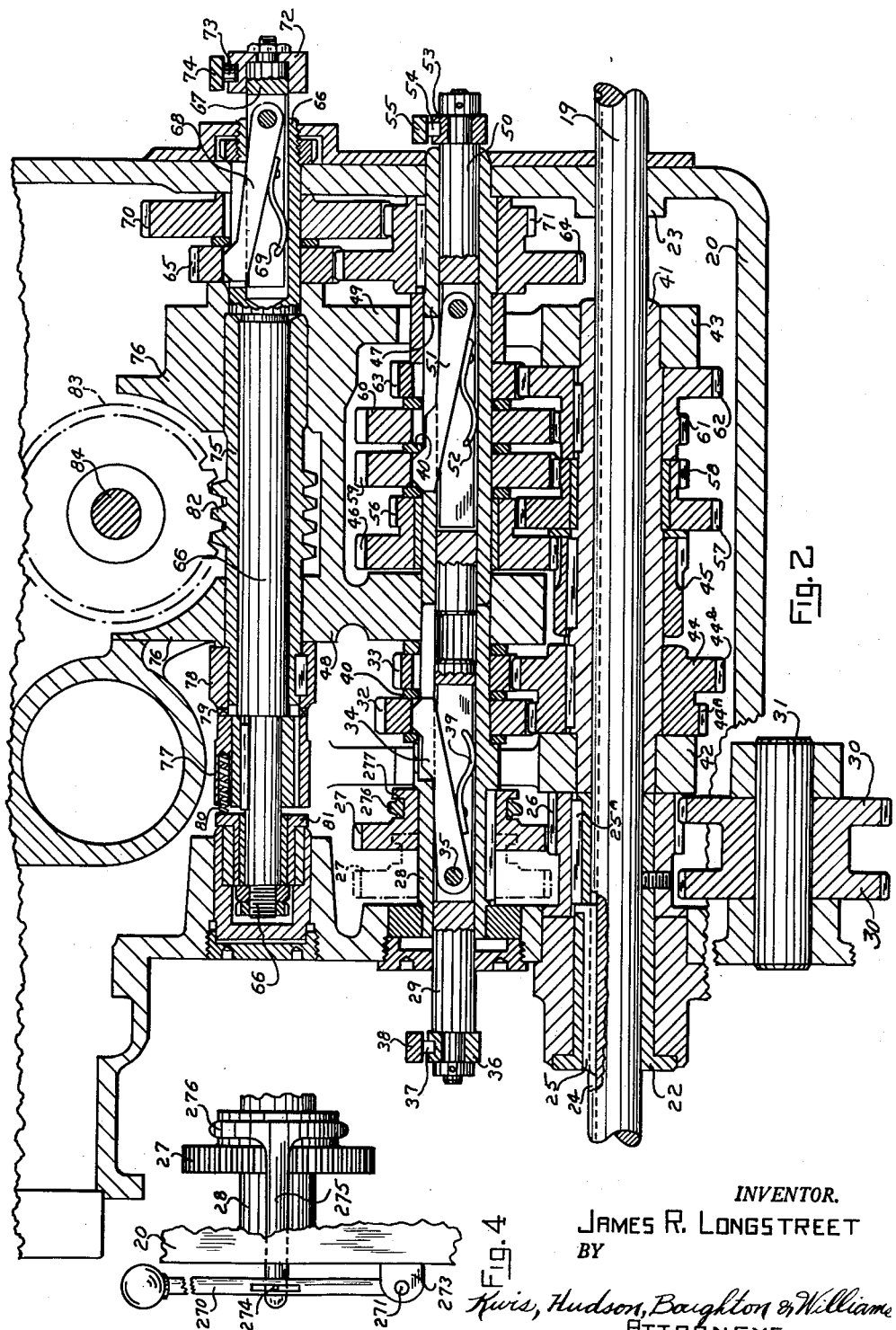
INVENTOR.
JAMES R. LONGSTREET
BY
Kwis, Hudson, Boughton & Williams
ATTORNEYS Patented Mar. 21, 1950

2,501,281

UNITED STATES PATENT OFFICE 2,501,281

GEAR TRAIN FOR MACHINE TOOL SLIDES

James R. Longstreet, Bedford, Ohio, assignor to The Warner & Swasey Company, Cleveland, Ohio, a corporation of Ohio Application March 11, 1946, Serial No. 653,466

16 Claims. (Cl. 74—363)

1

This invention relates to machine tools and has as its principal object to provide an improved gear train for moving a slide of the machine tool at a plurality of different feeding rates having a mathematical relationship.

Another object of this invention is to provide an improved gear train for moving the slide of a machine tool at a plurality of different feeding rates having definite mathematical relationships to the speeds of the machine spindle and to each other.

A further object of the invention is to provide gearing means for producing a plurality of ranges of feeding movements for the slide of a machine tool, each range constituting a geometric progression having a like increment, with the two ranges overlapping in such a manner that the lower feeds of one progression fall between the higher feeds of the other progression, whereby a single continuous range of feeds is provided with twice as many feeds in the most useful portion of the continuous range.

It is a still further object of the invention to provide an improved means to move the slide of a machine tool at a plurality of different ranges of feeding rates having a uniform increment, by employing an arrangement of selectively connectible gears of different ratios and cooperating connecting means for connecting the gears of a desired ratio to provide a continuous range of feeds, with the increment of a portion of the continuous range being a fraction of the uniform increment.

It is also an object of the invention to provide an improved gear train for moving the slide of a machine tool which comprises a unitary organization so constructed and arranged that a comparatively large number of feeding movements for the slide are produced by a relatively small number of gears compactly arranged in a housing of comparatively small size.

Another object of the invention is to the provide a machine tool of the type described with a unitary transmission in the drive between the feed shaft and slide, said transmission including a safety clutch automatically actuated at a predetermined load.

An additional object of the invention is to provide a reversing mechanism in the improved gear train for producing feeding movement of the slide of a machine tool in either direction at a plurality of different ranges of feeding rates having definite mathematical relationship to the speeds of a driven member of the machine tool and to each other.

Other objects and advantages of the invention will become apparent from the appended claims and from the detailed description of the preferred embodiment illustrated in the drawings wherein:

Fig. 1 is a front elevational view of a turret lathe showing a carriage, a cross slide, and an apron attached to the carriage, said apron housing the improved gear train;

Fig. 2 is a substantially vertical, sectionally developed, view through the apron carried by the carriage (to an enlarged scale) and illustrating the improved gearing train;

Fig. 3 is a fragmentary front elevational view of the carriage and apron on an enlarged scale with the cross slide in section;

Fig. 4 is a fragmentary, front elevational view of the cross slide carriage apron, with parts broken away, illustrating the reversing means for the gear train; and Fig. 5 is a chart showing one possible pair of feed ranges provided by the apparatus and illustrating the over-lapping relationship of the ranges which form a single feed range for the slide.

For the purpose of illustrating a preferred embodiment of the invention, I have shown in Fig. 1 a front elevational view of a conventional turret lathe having the usual bed 10, on which is supported the headstock 11 and the guideways 12. Upon the guideways 12 are carried the cross slide carriage 13 provided with a transversally moving slide 14, upon which is mounted the usual tool holder 15. The turret saddle and turret, generally designated 16, are also shown upon the guideways 12. Within the headstock 11 is journaled the usual work or tool spindle 17, which is driven by means not shown at a plurality of different speeds. The end of the work or tool spindle 17 has cooperating therewith the usual gear train 18 which drives a feed shaft 19 in timed relationship with the rotation of the work or tool spindle 17. The feed shaft 19 extends along the bed of the lathe in parallel relationship to the guideways 12 and through the apron 20 carried by carriage 13 for imparting motion thereto. The feed shaft further extends along the bed of the machine to and through the apron 21 of the turret saddle 16 for imparting motion thereto.

Turning now to Fig. 2 wherein the improved gear train of the invention is illustrated, it will be seen that the feed shaft 19 is journalled in a boss 23 located in one wall of apron 20 and is slidably supported in a sleeve 22 which is journalled within the other wall of the apron 20, the shaft 19 being provided with a keyway 24 for receiving a key 25 which is carried by said sleeve 22. Within the apron housing is disposed a gear 26 carried by sleeve 22 and keyed thereto by a key 25a. The teeth of gear 26 are shown in mesh with the teeth of a gear 27 slidably mounted and keyed to a sleeve 28 journalled in one wall of apron 20 and a bracket 48 carried by a boss in the apron. Housed within the sleeve 28 is a slidable shaft 29 extending through one wall of the apron housing 20. This pair of gears, together with others subsequently to be described, provide for forward movement of the cross slide 14. Reverse movement of the cross slide through the gear train, subsequently to be described, is effected by moving the sliding gear 27 to the dot and dash position shown in Fig. 2 where it is out of mesh with gear 26. The drive then is from gear 26 on shaft 19, a compounded idler 30 journalled on stub shaft 31 carried by the apron, to gear 27 now in the position illustrated by dot and dash lines, it being noted that the gear 30 and its shaft 31 are illustrated in a developed relationship for purposes of clarity and not in directly meshing contact with gear 27, as is the case in the practical form of the device.

For the purpose of sliding gear 27 to selectively engage it with either gear 26 or gear 30, a lever 270 is pivoted at 271 to a pin 272 mounted in the boss 273 provided on the side of the apron 20. The lever 270 has a slot intermediate its ends in which is engaged a pin 274 carried on the outer end of a shaft 275, the inner end of the shaft extending through a suitable opening in the side of the apron so that as lever 270 is rocked the inner end of shaft 275 will slide in a straight line within the apron. On the portion of shaft 275 within the apron is mounted a yoke 276 which has extending fingers engaged in the groove 277 of gear 27. Hence, when lever 270 is rocked to the left, shaft 275 moves yoke 276 and slides gear 27 along sleeve 28 (from the full line to the dot and dash position shown in Fig. 2) disengaging it from gear 26 and engaging it with gear 30, thus reversing the direction of rotation of the gear train about to be described.

The sleeve 28 also has journalled thereon two gears 32 and 33 of different sizes, each having their internal circumferences provided with suitable notches for keying to sleeve 28 and shaft 29. For this purpose the sleeve 28 has a slot formed therein, through which projects one end of a sliding key 34, which has its other end pivoted at 35 in a slot provided in shaft 29. Upon the outer end of shaft 29 is journalled a non-rotatable collar 36 having a bore therein for receiving a pin 37. The pin 37 is carried by a suitable operating lever 38 (see Fig. 1) located upon the side of the apron 20 for moving the shaft 29 and its key 34 to selectively engage either gear 32 or 33 with the sleeve 28. A conventional spring 39 is provided within the sleeve 28 and cooperating with the key 34 to force it outwardly into engagement with the selective gear. The end faces of the gear engaging portion of the key 34 are beveled so that when it is slid it will be cammed out of engagement with the notch of one gear and hence may be moved axially for engagement with the notch of the other gear. Suitable spacing rings 40 are provided between the gears 32, 33 to properly separate these gears and assist in the aforementioned camming action of the key.

The shaft 19 has a coaxial sleeve 41 rotatable thereon, the ends of the sleeve being journalled in brackets 42 and 43 provided in the apron 20. On this sleeve 41 is keyed a compounded gear 44 having two gear portions 44a and 44b of different ratios, respectively engaging the gears 32 and 33. Sleeve 41 is further provided with a gear 45 keyed thereon, which meshes with a gear 46, journalled upon a sleeve 47, the ends of which are rotatably mounted in brackets 48 and the wall of apron 20. Gear 46 has integrally formed therewith a smaller gear 56 which meshes with a gear 57 rotatably journalled upon the sleeve 41 surrounding shaft 19. A smaller gear 58 is formed integrally with gear 57 and meshes with a gear 59 journalled upon sleeve 47, the internal surface of this latter gear having a notch for cooperation with a sliding key 51 for selective connection to sleeve 47.

The key 51 is pivotally mounted in a slot provided in a shaft 50, which is slidable within the sleeve 47, and the key is forced outwardly through this slot in the shaft and a cooperating slot in sleeve 47 by means of a leaf spring 52. This key 51 is identical in construction and function with key 34 previously described and is operated by sliding the shaft 50 within the sleeve 47 by means of a non-rotatable collar 53 which is journalled on the end of shaft 50 and connected to a pivoted operating lever 55 by means of a pin 54 received in a bore provided in the collar. The operating lever 55 is conveniently located upon the side of the apron (see Fig. 1).

A gear 60, similar to gear 59, is likewise journalled upon sleeve 47 for selective engagement by key 51. The gear 60 meshes with a smaller gear 61, keyed to sleeve 41 and integral with gear 61 is a larger gear 62, which meshes with a gear 63, journalled upon the sleeve 47 and provided on its inner circumference with a suitable notch for clutching it to sleeve 47 by means of the key 51. Spacing rings 40 are also provided between the several gears in the manner previously described for the gears 32 and 33. Adjacent to the end of sleeve 47 is keyed a gear 64 which meshes with a gear 65 journalled upon an enlarged portion of a shaft 66, the ends of this shaft being received in suitable bosses of the apron 20. Slidably disposed within a bore in the shaft 66 is a plunger 67 which has a slot in which is mounted a key 68 and cooperating spring 69 identical in construction with keys 34 and 51 previously mentioned. The shaft 66 has a slot in alignment with the slot in plunger 67, through which the end of key 68 projects for selective engagement with a suitable notch in the inner circumference of the gear 65 or a gear 70, which is also journalled upon the shaft 66 for selective connection thereto. Gear 70 meshes with a smaller gear 71 formed integrally with the gear 64. The outer end of plunger 67 has a non-rotatable collar 72 journalled thereon in which is mounted a pin 73 connected to a lever 74 (see Fig. 1) for moving the plunger 67 and its key 68 within the shaft 66 to effect the aforesaid selective engagement with the gears 65 and 70.

There is thus provided a compact gear train which has three selective means operated by levers 38, 55 and 74 for connecting gears of different ratios into the train to provide two ranges of speeds for shaft 66. Assuming that the key 68 is in engagement with gear 70, the operation of the two levers 38 and 55 to selectively connect each of the gears 32, 33, 59, 60 and 63 into the gear train will result in producing a range of six speeds for driving the shaft 66. If lever 74 be now actuated to move plunger 67 and key 68 to engage gear 65, selective operation of levers 38 and 55 to again connect each of the gears of different ratios into the train will produce a second range of six speeds for shaft 66. The gear ratios are so chosen that the speeds within each range form a geometric progression having an increment, which is the square of the increment between the speeds of the plurality of speeds at which the spindle 17 rotates. The ratios of gears 64, 65 and 70, 71 are such that the two ranges overlap with the lower speeds of the higher range (provided by gears 64 and 65) falling between the higher speeds of the lower range (provided by gears 70, 71) so that a single continuous range of speeds is provided, with twice as many speeds in the overlapping portion of the single continuous range as there are at the ends thereof. The increment between these middle portion speeds is the square root of the increment between the speeds in the end portions of the continuous range, and hence equal to the increment between each of the speeds at which the spindle 17 rotates.

This relationship of the speeds of shaft 66 for one particular set of gears will be more readily understood by referring to Fig. 5 of the drawings wherein the two ranges of speeds are represented in terms of the resulting feeds of slide 14. It will be noted that the upper line of Fig. 5 gives the range of the six feeds for the slide when gears 70 and 71 are engaged and the gears 32, 33, 59, 60 and 63 are selectively connected into the train. These feeds form a geometric progression having an increment equal to 1.54 which is equal to the square of the increment of the spindle speeds, the latter increment being chosen as 1.241. The lower line of Fig. 5 gives the range of the six feeds for the slide when gears 64 and 65 are engaged and gears 32, 33, 59, 60, and 63 are selectively connected into the train. These latter feeds also form a geometric progression having an increment of 1.54 with the lower feeds of this range overlapping and falling between the higher feeds of the first range to form a single, continuous range. The increment between the feeds of the overlapping portion of this single, continuous range is $\sqrt{1.54}=1.241$ which is equal to the increment of the spindle speeds so that there are twice as many feeds in the middle, or most used portion of the range, as there are at the end portions thereof.

While I have disclosed the increment between the feeds of each individual range as being the square of the spindle speed increment, and the increment between the feeds of the middle portion of the single continuous range as equal to the spindle speed increment, it is obvious that other gear ratios may be provided if different increments and/or different types of progressions of the feeds are desired without departing from the spirit of this invention. The various gears which are employed to provide each feed of the ranges together with the resulting feeding movements of the slide for one particular set of gear ratios may be expressed in tabular form as follows:

| Gears Employed in Apron Gear Train | Slide Feed (Inch per Rev. of Spindle) |
|---|---|
| 26, 27, 33, 44b, 45, 46, 56, 57, 58, 59, 71, 70 | .0032 |
| 26, 27, 32, 44a, 45, 46, 56, 57, 58, 59, 71, 70 | .0050 |
| 26, 27, 33, 44b, 61, 60, 71, 70 | .0077 |
| 26, 27, 33, 44b, 45, 46, 56, 57, 58, 59, 64, 65 | .0096 |
| 26, 27, 32, 44a, 61, 60, 71, 70 | .0119 |
| 26, 27, 32, 44a, 45, 46, 56, 57, 58, 59, 64, 65 | .0148 |
| 26, 27, 33, 44b, 62, 63, 71, 70 | .0183 |
| 26, 27, 33, 44b, 61, 60, 64, 65 | .0228 |
| 26, 27, 32, 44a, 62, 63, 71, 70 | .0281 |
| 26, 27, 32, 44a, 61, 60, 64, 65 | .0350 |
| 26, 27, 33, 44b, 62, 63, 64, 65 | .0539 |
| 26, 27, 32, 44a, 62, 63, 64, 65 | .0831 |

Turning again to Fig. 2 it will be seen that a worm sleeve 75 is journalled in two bosses 76, provided in the apron, with the shaft 66 extending through and beyond the worm sleeve 75. A clutch member 77 is keyed to this portion of shaft 66 and cooperates with a similar clutch member 78 on the adjacent end of worm sleeve 75. The adjacent faces of these clutch members 77 and 78 are provided with meshing teeth 79, which are normally held in engagement by the thrust of a plurality of springs 80, extending between clutch member 77 and a bushing 81. There is thus provided a safety clutch whereby the driving connection between sleeve 75 and shaft 66 is disconnected when an abnormal load is placed upon the worm sleeve 75.

A worm 82 is formed integrally on the outer surface of worm sleeve 75 and meshes with a worm wheel 83 which freely rotates on a shaft 84. Shaft 84 carries also a spur gear 85 which is freely rotatable thereon (see Fig. 3) and said spur-gear 85 meshes with a gear 86 keyed to a stub shaft 87, which shaft also has keyed thereto a second gear 88, which in turn meshes with a gear 89 operatively connected with a nut, threadedly engaged with a screw 90 for moving the cross slide 14 transversely of the lathe bed. A clutch is interposed in shaft 84, between the worm gear 83 and the spur gear 85, and said clutch may be engaged or disengaged by a clutch lever 91 in a manner well known in the art.

It will now be apparent that the improved gear train which I have provided between the feed shaft 19 and the shaft 84 furnishes a single continuous range of feeding movements for the slide formed from two overlapping ranges so that twice as many feeds are provided in the middle portion of the continuous range, which is the most useful range for machining operations, and this affords a finer selection of feeding movements for a particular work operation, thus allowing the machine tool to be operated at its maximum efficiency. Also, by using the above described arrangement of axially aligned shafts and sleeves, together with a concentric sleeve upon the feed shaft, I am able to provide a wide range of feeding movements by a very compact gearing train, which is arranged as a unit in a comparatively small housing or apron carried by the carriage.

While I have described my invention as being applied primarily for transverse movement of a slide, such as a cross slide of a turret lathe, it will be readily apparent that the same mechanism may be employed for the feeding movement of the carriage of the cross slide and also for the feeding movement of the turret saddle or any other machine tool slide having a feeding movement.

While I have shown a preferred embodiment of the invention, I do not wish to be confined to the precise details illustrated, but desire to cover all modifications coming within the spirit and scope of my invention as set forth in the appended claims.

Having thus described my invention, I claim:

1. In a machine tool of the type described having a rotatable spindle adapted to carry work or tools, a slide, a feed shaft driven in timed relationship with the spindle for moving said slide, and driving connections between said feed shaft and said slide; the improvement which comprises, a gear train forming a part of said driving connections, said gear train comprising a plurality of shafts including a driven shaft and a plurality of intermeshing gears of different ratios carried by said shafts and the feed shaft, selective means for connecting certain of said gears to their respective shafts to drive the gears on said driven shaft at a plurality of speeds, means to selectively connect the gears on the driven shaft to that shaft to provide a plurality of ranges of speeds for the driven shaft with each range of speeds producing a corresponding range of feeding movements for the slide, the feeds of each range having values such as to constitute a geometric progression having a constant increment, said feed ranges overlapping one another to form a single feed range with the increment of the overlapping portion thereof being smaller than the increments of the end portions, and means supporting said gear train in a manner such that it is axially movable as a unit along said shaft without interrupting the said driving connections.

2. The combination as defined in claim 1 and further comprising a reversing gear cooperating with the gear train, and means to selectively engage said reversing gear in said gear train to reverse the feeding movement of said slide.

3. In a machine tool of the type described having a spindle adapted to carry work or tools, said spindle being driven at a plurality of speeds, a slide, a feed shaft driven in timed relationship with the spindle for moving said slide and driving connections between said feed shaft and said slide; the improvement which comprises, a gear train forming a part of said driving connections, said gear train comprising a plurality of shafts including a driven shaft and a plurality of intermeshing gears of different ratios carried by said shafts and the feed shaft, selective means for connecting certain of said gears to their their respective shafts to drive the gears on said driven shaft at a plurality of speeds, means to selectively connect the gears on the driven shaft to that shaft to provide a plurality of ranges of speeds for the driven shaft with each range of speeds producing a corresponding range of feeding movements for the slide, the feeds of each range having values such as to constitute a geometric progression having an increment related to the increment of the spindle speeds, said feed ranges overlapping one another to form a single feed range with the increment of the overlapping portion thereof being smaller than the increments of the end portions, and means supporting said gear train in a manner such that it is axially movable as a unit along said feed shaft without interrupting the said driving connections.

4. In a machine tool of the type described, the combination of a work or tool supporting spindle adapted to be driven at different speeds having a constant increment, a feed shaft, means to drive said feed shaft in timed relationship with said spindle, a slide, and driving connections between said feed shaft and said slide for producing feeding movements of the slide comprising, a second shaft, a pair of gears of different sizes journaled on said second shaft, means to selectively connect either of said gears to said second shaft, a gear train for driving said pair of gears from said feed shaft, said gear train including a plurality of selectively connectable gears of different ratios and means to selectively connect said connectable gears in said train, the ratios of the gears of said train and said pair of gears being such that when one of said pair of gears is connected to its shaft, selective connection of the gears in said gear train provides a first range of feeds for the slide with the several feeds thereof forming a geometric progression having an increment which is a power of the increment of the spindle speed, and when the other of said pair of gears is connected to its shaft, selective connection of the gears in the gear train provides a second range of feeds for the slide forming a geometric progression having the same increment as that of the first range, the two ranges of feeds overlapping with the lower feeds of the second range falling between the higher feeds of the first range to form a single continuous range of feeds, with the increment in the overlapping portion being a root of the increment between the feeds of the end portions.

5. In a machine tool of the type described, the combination of a work supporting spindle adapted to be driven at different speeds having a constant increment, a feed shaft, means to drive said feed shaft in timed relationship with said spindle, a slide, and driving connections between said feed shaft and slide for producing feeding movements of the slide comprising, a second shaft, a pair of gears of different sizes journaled on said second shaft, means to selectively connect either of said gears to said second shaft, a gear train for driving said pair of gears from said feed shaft, said gear train including a plurality of selectively connectable gears of different ratios, means to selectively connect said connectable gears in said train, the ratios of gears of said train and said pair of gears being such that two ranges of feeds are provided for the slide, each range having the same constant increment between the several feeds thereof which increment bears a mathematical relationship to the increment between the spindle speeds, the lower feeds of one range overlapping and falling between the higher feeds of the other range to produce a single continuous range of feeds having an increment between the feeds of the overlapping portion which is a fraction of that between the feeds of the end portions of the single continuous range, and an automatically disengageable safety clutch connected to said second shaft whereby an overload on said gear train will disconnect the driving connections for the slide.

6. In a machine tool of the type described, the combination of a spindle adapted to be driven at different speeds and having means to support a work piece or a tool, a feed shaft, means to drive said feed shaft in timed relationship with said spindle, a slide, driving connections between said feed shaft and said slide for moving the latter including, a pair of shafts, a plurality of intermeshing gears of different ratios carried by one of said pair of shafts and by said feed shaft, selective means for connecting certain of said gears to said one shaft, a pair of gears of different sizes journaled on the second of said pair of shafts and meshing with a pair of gears keyed to the first-mentioned of said pair of shafts, selective means for connecting either of said pair of journaled gears to said second shaft, the ratios of the gears on said pair of shafts and said feed shaft being such that with the last-mentioned connecting means in engagement with one of the pair of journaled gears, selective engagement of the other connecting means with the gears associated therewith provides a first range of slide feeds forming a geometric progression having an increment related to the increment of the spindle speeds, and with the connecting means for the pair of journaled gears in engagement with the other gear of said pair, selective engagement of the other connecting means with the associated gears provides a second range of feeds in a like geometric progression, with the lower feeds of the second range overlapping and falling between the higher feeds of the first range to provide a single, continuous feeding range with a smaller increment in the overlapping portion than in the end portions.

7. The combination as defined in claim 6 and further comprising, a reversing gear, and means to selectively connect said reversing gear between one gear on said feed shaft and a gear on the first-mentioned shaft of said pair of shafts to reverse the direction of slide movement.

8. In a machine tool of the type described, the combination of a work or tool supporting spindle adapted to be driven at different speeds having a constant increment, a feed shaft, means to drive said shaft in timed relationship with said spindle, a slide, a second shaft, operative connections between said slide and the second shaft for producing feeding movement of the slide, a plurality of gears journaled on said second shaft, means carried by said second shaft for selectively connecting each of said gears to that shaft, a third shaft, a first set of gears connected to the third shaft, and meshing with the gears journaled on said second shaft, a second set of gears journaled on said third shaft, means carried by said third shaft for selectively connecting certain of said second set of gears of said third shaft, a fourth shaft in axial alignment with said third shaft, a set of gears carried by said fourth shaft with certain of the individual gears thereof connected to and others journaled on the shaft, means carried by said fourth shaft for selectively connecting the gears journaled thereon to said fourth shaft, and a plurality of gears carried by the feed shaft and meshing with the sets of gears on the third and fourth shafts, whereby rotation of said feed shaft will produce a range of feeds for said slide as the connecting means are selectively engaged with different ones of the cooperating gears, the ratios of the gears being such that with the first-mentioned connecting means in engagement with one of the first-mentioned plurality of gears, selective engagement of the other two connecting means with their respective gears provides a first range of slide feeds in a geometric progression having an increment equal to the square of increment of the spindle speeds, and with the first-mentioned connecting means in engagement with a different one of the first-mentioned plurality of gears, selective engagement of the other two connecting means with their respective gears provides a second range of slide feeds in a like geometric progression, the two ranges of feeds overlapping with the lower feeds of the second range falling between the higher feeds of the first range to form a single continuous range of feeds having an increment between the feeds in the overlapping portion which is equal to the square root of the increment between the feeds of the end portions.

9. The combination as defined in claim 8 wherein means are provided on the fourth shaft for slidably connecting thereto one of the gears carried thereon, a reversing gear in engagement with one of the gears on the feed shaft, and means to slide the slidable gear on the fourth shaft to disengage it from the cooperating gear on the feed shaft and engage it with said reversing gear to thereby reverse the feeding movement of the slide.

10. In a machine tool of the type described, the combination of a work or tool supporting spindle adapted to be driven at different speeds having an increment relationship, a feed shaft, means to drive said feed shaft in timed relationship with said spindle, a slide, and driving connections between said feed shaft and slide for producing feeding movement of the slide comprising, a sleeve on said feed shaft, a plurality of gears carried by said shaft and sleeve, a second shaft, a gear connected to the second shaft and meshing with a gear on the feed shaft, a set of gears journaled on said second shaft and meshing with certain of the gears on said sleeve, connecting means carried by said second shaft for selectively connecting certain of the last-mentioned gears to the second shaft, a third shaft, a second set of gears journaled on the third shaft and each meshing with one of the gears carried by the feed shaft, connecting means carried by said third shaft for selectively connecting the second set of gears thereto, a pair of gears connected to the third shaft, a fourth shaft, a pair of gears journaled on the fourth shaft in mesh with the pair of gears on said third shaft, connecting means carried by said fourth shaft for selectively connecting each of the gears journaled thereon to said fourth shaft, whereby rotation of said feed shaft will produce a range of feeds for said slide as the several connecting means are selectively engaged with different ones of the cooperating gears, the ratios of the gears being such that with the last-mentioned connecting means in engagement with one of the pair of gears on the fourth shaft, selective engagement of the other two connecting means with their respective gears provides a first-range of speeds in a geometric progression having an increment equal to the square of the increment between the spindle speeds and with the last-mentioned connecting means in engagement with the other of the pair of gears on the fourth shaft, selective engagement of the other two connecting means with their respective gears provides a second range of feeds in a like geometric progression, with the lower feeds of the second range overlapping and falling between the higher feeds of the first range to form a single continuous range of feeds having an increment between the feeds in the overlapping portion which is equal to the increment between the spindle speeds.

11. The combination as defined in claim 10 and further comprising an automatically disengageable clutch connected to said fourth shaft whereby an overload on said slide will disconnect the driving connections for the slide.

12. In a machine tool of the type described having a spindle adapted to carry work or tools and driven at various speeds, a feed shaft, driving connections between the spindle and feed shaft to drive the latter in timed relationship with the former, a slide, and operative connections between the feed shaft and the slide to produce feeding movements of the slide; the improvement which comprises a gear train forming a part of said operative connections including, a sleeve on said feed shaft, a plurality of gears carried by said shaft and sleeve, a pair of axially aligned shafts, a set of keyable gears journaled on each one of said pair of shafts in mesh with the gears on said feed shaft and sleeve, means for selectively keying one gear of each set to its respective shaft, a pair of gears keyed to one of said aligned shafts, a fourth shaft, a pair of gears journaled on said fourth shaft and meshing with the pair of gears keyed to said one of the aligned shafts, means carried by the fourth shaft to selectively key thereto each of the pair of gears journaled thereon, the gears of the train being so constructed and arranged that their ratios provide two ranges of feeds for the slide each having the same constant increment related to the increment between the spindle speeds, with the lower feeds of one range overlapping and falling between the higher feeds of the other range to produce a single continuous range of feeds having an increment between the feeds of the overlapping portion which is a fraction of that between the feeds of the end portions of the single continuous range.

13. The combination as defined in claim 12 and further comprising a reversing gear in mesh with one of the gears carried by said feed shaft, means to slidably connect one of the gears on one of the said pair of aligned shafts, and means to slide said last-mentioned gear to disengage it from its cooperating gear on said feed shaft and engage the said slidable gear with said reversing gear whereby the direction of rotation of the gear train may be reversed with corresponding reversal of the direction of movement of the slide.

14. In a machine tool of the type described, the combination of a work supporting spindle adapted to be driven at different speeds, a feed shaft, means to drive said feed shaft in timed relationship with said spindle, a slide, and driving connections between said feed shaft and slide for producing feeding movements of the slide comprising, a second shaft, a plurality of gears of different sizes journalled on said second shaft, means to selectively connect each of said gears to said second shaft, a gear train for driving said plurality of gears from said feed shaft, said gear train including a plurality of selectively connectable gears of different ratios, means to selectively connects said connectable gears in said train, the ratios of gears of said train and said first-mentioned plurality of gears being such that a plurality of ranges of feeds are provided for the slide, each range having the same constant increment between the several feeds thereof, the lower feeds of each range overlapping and falling between the higher feeds of the next preceding range to produce a single continuous range of feeds having an increment between the feeds of the overlapping portion which is smaller than that between the feeds of the end portions of the single continuous range, and means supporting said gear train in a manner such that it is axially movable as a unit along said feed shaft without interrupting the said driving connections.

15. In a machine tool of the type described, the combination of a work supporting spindle adapted to be driven at different speeds having a constant increment, a feed shaft, means to drive said feed shaft in timed relationship with said spindle, a slide, and driving connections between said feed shaft and slide for producing feeding movements of the slide comprising, a second shaft, a pair of gears of different sizes journalled on said second shaft, means to selectively connect either of said gears to said second shaft, a gear train for driving said pair of gears from said feed shaft, said gear train including a plurality of selectively connectable gears of different ratios, means to selectively connect said connectable gears in said train, the ratios of gears of said train and said pair of gears being such that two ranges of feeds are provided for the slide, each range having the same constant increment between the several feeds thereof which increment bears a mathematical relationship to the increment between the spindle speeds, the lower feeds of one range overlapping and falling between the higher feeds of the other range to produce a single continuous range of feeds having an increment between the feeds of the overlapping portion which is smaller than that between the feeds of the end portions of the single continuous range, and means supporting said gear train in a manner such that it is axially movable as a unit along said feed shaft without interrupting the said driving connections.

16. In a machine tool of the type described, the combination of a work or tool supporting spindle adapted to be driven at different speeds having a constant increment, a slide, and driving connections between the drive for said spindle and said slide for producing feeding movements of the slide comprising a gear train driven in timed relation with the rotation of said spindle, said gear train including a shaft, a pair of gears of different sizes journalled on said shaft, means to selectively connect either of said gears to said shaft, a plurality of other gears of different ratios adapted to be selectively connected in said train, and means to selectively connect said other gears in said train, the ratios of the said other gears and said pair of gears being such that when one of said pair of gears is connected to its shaft, selective connection of the said other gears in said gear train provides a first range of feeds for the slide with the several feeds thereof having the same constant increment therebetween which increment bears a mathematical relationship to the increment between the spindle speeds, and when the other of said pair of gears is connected to its shaft, selective connection of the said other gears in the gear train provides a second range of feeds for the slide with the same constant increment between the feeds thereof as that between the several feeds of said first range, the two ranges of feeds overlapping with the lower feeds of the second range falling between the higher feeds of the first range to form a single continuous range of feeds, with the increment in the overlapping portion being a fraction of that between the feeds of the end portions of the single continuous range.

JAMES R. LONGSTREET.

REFERENCES CITED

The following references are of record in the file of this patent:

UNITED STATES PATENTS

| Number | Name | Date |
|---|---|---|
| 1,165,369 | De Leeuw | Dec. 21, 1915 |
| 1,605,931 | Emmes | Nov. 9, 1926 |